United States Patent

Wilkinson

[15] 3,699,358

[45] Oct. 17, 1972

[54] CURRENT SHARING PARALLEL TRANSISTOR CIRCUIT

[72] Inventor: Bruce L. Wilkinson, Torrance, Calif.

[73] Assignee: Pioneer Magnetics, Inc., Santa Monica, Calif.

[22] Filed: June 14, 1971

[21] Appl. No.: 152,548

[52] U.S. Cl. ....................307/242, 307/254, 307/275

[51] Int. Cl. ............................................H03k 17/56

[58] Field of Search .......307/254, 275, 242; 331/112

[56] References Cited

UNITED STATES PATENTS

| | | | |
|---|---|---|---|
| 3,184,615 | 5/1965 | Stover | 307/254 |
| 3,213,295 | 10/1965 | Grosch et al. | 307/254 |
| 3,174,053 | 3/1965 | Contino | 307/254 |
| 2,900,508 | 8/1959 | Tillman | 307/275 |

*Primary Examiner*—James W. Lawrence
*Assistant Examiner*—Harold A. Dixon
*Attorney*—Jessup & Beecher

[57] ABSTRACT

An improved circuit is provided effectively to connect a plurality of power transistors in a parallel connection for handling power levels beyond the capabilities of the individual transistors. The circuit includes a transformer intercoupling the emitters of the individual transistors for current sharing purposes, and for insuring equal current division among the individual transistors during continuous operation thereof, and during intermittent "on-off" operation thereof when the transistors are used for switching purposes.

4 Claims, 8 Drawing Figures

PATENTED OCT 17 1972

3,699,358

INVENTOR:
Bruce L. Wilkinson
Jenny and Beecher
By Keith D. Beecher
ATTORNEYS

INVENTOR:
Bruce L. Wilkinson
Jessup and Beecher
By Keith D. Beecher
ATTORNEYS

CURRENT SHARING PARALLEL TRANSISTOR CIRCUIT

BACKGROUND OF THE INVENTION

It is often desirable in the design of power supplies and other electronic equipment to operate a plurality of power transistors in a parallel mode so as to obtain sufficient total current carrying capacity for the system, when the current involved is beyond the capabilities of the individual transistors. This is usually achieved in the prior art by the provision of small resistors in series with the respective emitters of the transistors, so as to insure that all transistors will share equally the total current to be handled.

If, however, it is desired to use the parallel transistor connection in circuits such as the flyback type of power supply described, for example, in abandoned Application Ser. No. 58,042, which was filed July 24, 1970 in the name of James K. Berger, and which is assigned to the present assignee, problems arise since the power transistors are used in such applications in an "on-off" mode to switch currents. Since it is common for transistors to exhibit different storage and turn-off times, the usual emitter-resistor prior art parallel connection for the transistors, such as described above, is unsatisfactory, since it does not provide for all the transistors to become non-conductive at the same instant. This means that the last transistor to remain conductive during any switching cycle is exposed to an excessive power level, which ultimately can result in the destruction of that transistor.

The circuit of the present invention provides an improved means for insuring equal current division among the paralleled power transistors, and it also serves to equalize the turn-off times for the parallel transistors when they are used for switching purposes, so that the aforesaid problem does not arise.

DETAILED DESCRIPTION OF THE ILLUSTRATED EMBODIMENTS

Figure 1:
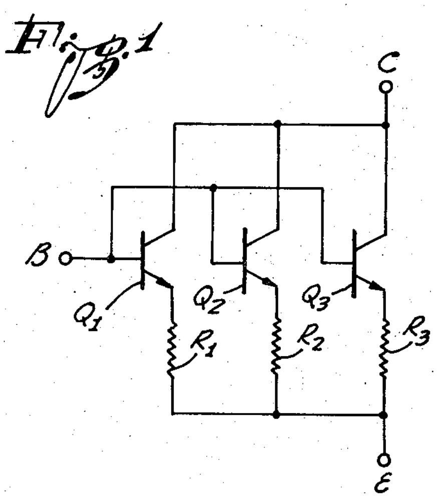
FIG. 1 is a circuit diagram of a usual prior art parallel connection for a series of power transistors, and which includes series resistors connected to the individual emitters.

In the prior art circuit of FIG. 1, the collectors of three transistors Q1, Q2 and Q3 are interconnected and are connected to one terminal of an appropriate exciting source designated C. The emitters of the three transistors are connected respectively through three resistors R1, R2 and R3 to the other terminal of the exciting source designated E. The base electrodes of the transistors Q1, Q2 and Q3 are all connected, for example, to an input terminal B. The transistors may be field effect transistors having gate, source and drain electrodes, as are well known to the art.

Assuming that R1 = R2 = R3, and that the voltage across the three resistors at full current is large compared with the differences in the base-emitter voltages among the transistors Q1, Q2 and Q3; the emitter current in the three transistors will be nearly equal for steady current. If, however, the transistors Q1, Q2 and Q3 in the circuit of FIG. 1 are used to switch currents on and off, the circuit of FIG. 1 does not serve as a satisfactory means for insuring equal current sharing between the three transistors for the reasons previously described herein.

As mentioned above, it is common for transistors to exhibit different and various storage and turn-off times, so that when the transistors Q1, Q2 and Q3 of the parallel combination in the prior art circuit of FIG. 1 are rendered non-conductive, there is nothing to cause them all to turn off at the same time. This means that the individual transistor which is the last to become non-conductive will, for a period of time, carry the full load current. In addition, when the last-named transistor finally becomes non-conductive, the voltage across the circuit will rise as the total current is decaying in that transistor, while the other transistors are not carrying any current.

Consequently, the slowest transistor to become non-conductive will experience excessive power dissipation, and it will be subject to a greater heating effect than the other transistors. As the latter transistor becomes heated, it will exhibit even slower turn-off characteristics, while the other transistors are cooler due to the reduction in switching losses as far as they are concerned, and thus exhibit faster turn-off characteristics. This condition often creates a regenerative effect which results in the eventual destruction of the transistor exhibiting the slowest turn-off characteristics.

The circuit of the present invention, on the other hand, provides an improved means of assuring not only equal current division among the various power transistors in the parallel connection, but it also serves to equalize the turn-off times for all the transistors. This latter feature is especially appropriate when the transistors are used in a switching circuit.

Figure 2:
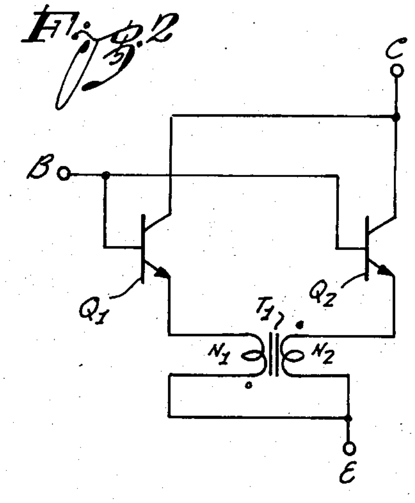
FIG. 2 is a circuit like FIG. of one embodiment of the invention, and involving two transistors with their base and collector electrodes connected together.

In the embodiment of FIG. 2, the transistors Q1 and Q2 have their emitters intercoupled by a transformer T1, as shown, this being achieved by connecting the emitters to one side of the primary winding N1 and secondary winding N2 respectively of the transformer T1, the other sides of these windings being connected to the terminal T.

In the embodiment of FIG. 2, the transformer T1 has two equal windings and is connected such that the emitter current of the transistor Q1 flows through the winding N1 in a direction so as to oppose the current from the emitter of the transistor Q2 in the winding N2 of the transformer.

It is a known property of transformers that, to the extent the magnetizing current is made negligible, the current in the primary and secondary windings must be opposite in polarity and bear an inverse relationship to the number of turns. This relationship may be expressed mathematically as follows:

$$N1.I1 + N2.I2 \qquad (1)$$

Where:

$N1$ is the number of turns of the primary winding;

$N2$ is the number of turns of the secondary winding, $I1$ is the primary current, $I2$ is the secondary current.

Since in the circuit of FIG. 2, the windings are assumed to be the same, that is, N1 = N2, and the polarity is opposite by connection, as shown by the dots in FIG. 2, it follows that the current I1 must equal the current I2.

Now, for example, should the emitter current of the transistor Q1 increase, the effect of the transformer T1 is to make the potential of the emitter of the transistor Q1 more positive with respect to the common point E, and to make the potential of the emitter of the transistor Q2 less positive with respect to the common point E. Since the base of the transistor Q1 and the base of the transistor Q2 are connected to the same electrical point, the base-emitter voltage of the transistor Q1 therefore decreases, and the base-emitter voltage of the transistor Q2 therefore increases, which results in a greater conduction in the transistor Q2 and a lesser conduction in the transistor Q1, until the emitter currents of both transistors are again balanced. The transformer T1 assures, therefore, an equal division of current through the two transistors Q1 and Q2 when the transistors are conductive.

Now, when the transistors are rendered non-conductive, should the base potential B be driven slightly negative with respect to the potential E, the transistors will be rendered non-conductive. If one of the two transistors begins to turn off before the others, the transformer T1 causes the base-emitter voltage on that particular transistor to increase in the direction to prevent turn-off, while at the same time causing greater reverse bias on the other transistor so as to increase the turn-off speed of the other transistor. Therefore, the two transistors share current equally during the turn-off period, as well as during normal conduction, and the circuit assures that both transistors may be switched repeatedly, and for each turn-off, it assures that both transistors will be rendered non-conductive at the same time.

Figure 3:
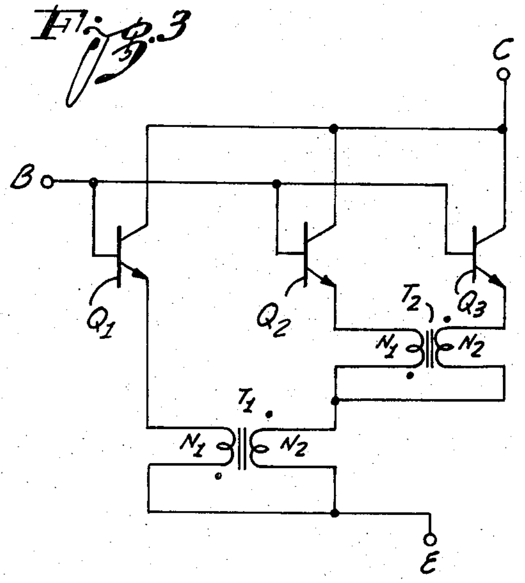
FIG. 3 is a circuit, like the circuit of FIG. 2, but involving three transistors.

The circuit of FIG. 3 is generally similar to the circuit of FIG. 1, except that in the circuit of FIG. 3 three transistors are controlled by two transformers T1 and T2, the transformers being connected as shown. Specially, the transformer T2 is connected in the emitter circuit of the transistor Q2, and the other winding of the transformer T2 is connected to the emitter of the third transistor Q3. The operation of the circuit of FIG. 3 is generally the same as that of FIG. 2, as described above. In the example of FIG. 3, since it is desired that the emitter currents of the transistors all be equal, the winding N2 of the transformer T1 will carry twice the current of the other windings, and must therefore have one-half the number of turns.

Figure 4:
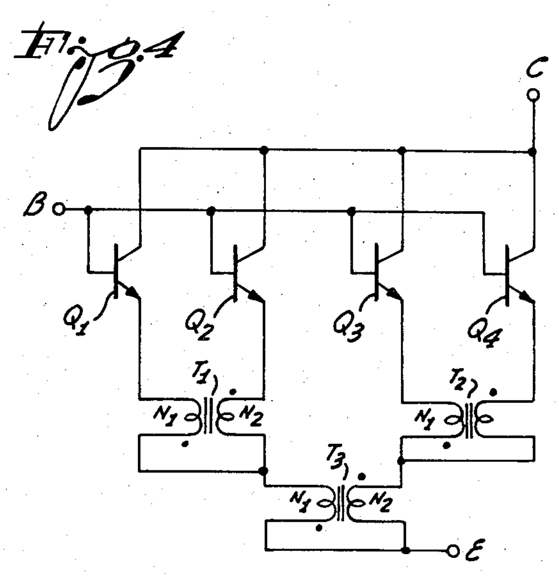
FIG. 4 is a circuit like the circuits of FIGS. 2 and 3, but involving four transistors.

The circuit of FIG. 4 is generally similar to the circuits of FIGS. 2 and 3, except that in the latter case four transistors Q1, Q2, Q3 and Q4 are controlled by three transformers T1, T2 and T3. In the latter case, both windings N1 and N2 of the transformer T3 carry double current, so that all the windings N1 and N2 of the three transformers may have the same number of turns.

Figure 5:
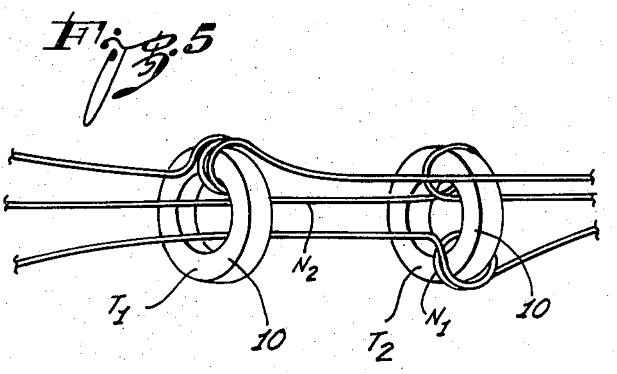
FIG. 5 is a schematic representation showing the actual construction of a typical transformer that may be used for intercoupling the emitters of the various transistors in the circuits of FIGS. 2–4.

The transformers T1, T2 or T3 may be formed of small ferrite cores with one or two turns on each core, such as shown in FIG. 5. A pair of cores 10 is shown in the particular example of FIG. 5, and these cores have windings on them which are intended to constitute, for example, the transformers T1 and T2 of FIG. 3.

The invention provides, therefore, an improved circuit for equalizing currents in a parallel combination of transformers, and which assures that the currents will be equalized not only during normal conduction of the transistors, but also during turn-off. The circuit of the invention has a further advantage in that there is no power loss added to the circuit, as compared with the prior art circuit in FIG. 1, in which each resistor provides a power loss ($I^2R$), and which often can be significant.

Figure 6:
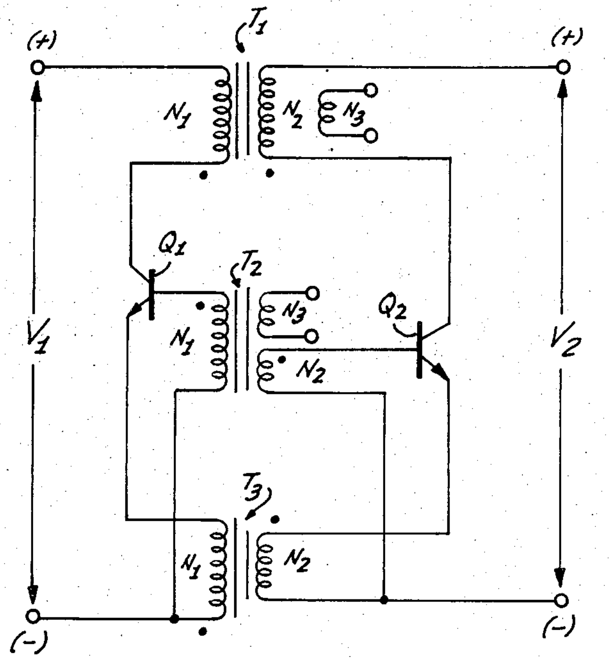
FIG. 6 is a circuit representing a further embodiment in which there is no common connection to the base or collector electrodes of the transistors.

The circuit of FIG. 6, like the circuit of FIG. 2, incorporates two transistors Q1 and Q2. In the circuit of FIG. 6, however, the base and collector electrodes of the transistors are not connected to a common lead. In the circuit of FIG. 6, the collector of the transistor Q1 is connected through the winding N1 of a transformer T1 to the positive terminal of a source of potential V1, and the base of the transistor is connected through the winding N1 of a transformer T2 to the negative terminal of that source, while the emitter is connected through the winding N1 of a transformer T3 to the negative terminal of that source.

The winding N2 of the transformer T1 is connected to the positive terminal of a potential source V2, and to the collector of a transistor Q2. The base of the transistor Q2 is connected through the winding N2 of the transformer T2 to the negative terminal of the source V2, and the emitter of the transistor Q2 is connected through the winding N2 of the transformer T3 to that negative terminal. The aforesaid windings have polarities as indicated in FIG. 6. A winding N3 is also associated with the transformer T1, and a similar winding N3 is associated with the transformer T2.

The transformer T2 is a drive transformer, the winding N3 being driven by input signal which causes both the transistors Q1 and Q2 simultaneously to switch between conductive and non-conductive states. The transformer T3 serves to balance the current in the same manner as the transformer T1 in FIG. 2.

In most applications the voltage V1 will be equal to the voltage V2, and the windings N1 and N2 of each of the transformers T1, T2 and T3 will have an equal number of turns.

A useful application for the circuit of FIG. 6 is in a power system requiring operation, for example, from an input of 115 or 230 volts alternating current. In such a system, the alternating current voltage would be converted to a direct current by a rectifier stroke filter combination. The resulting direct current would then supply the voltages V1 and V2 in parallel for the 115 volt alternating current case, and would supply the voltages V1 and V2 in series for the 230 volt case.

Although the circuit of FIG. 6 may comprise two transistors, as shown, and may incorporate equal supply voltages and equal currents, the circuit is not restricted to such criteria for proper operation. Any number of transistors may be caused to share current with the system of FIG. 6.

Figure 7:
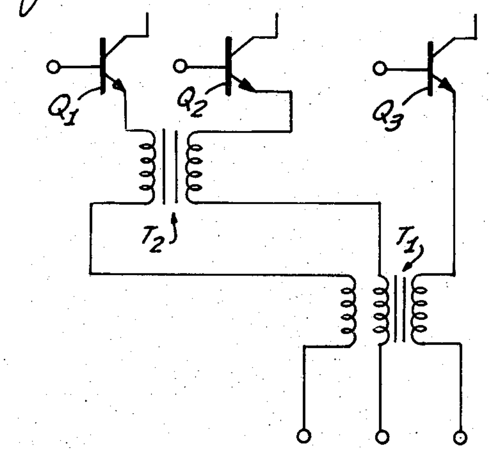
FIG. 7 is a circuit like FIG. 3, but without the common base or collector connections.
Figure 8:
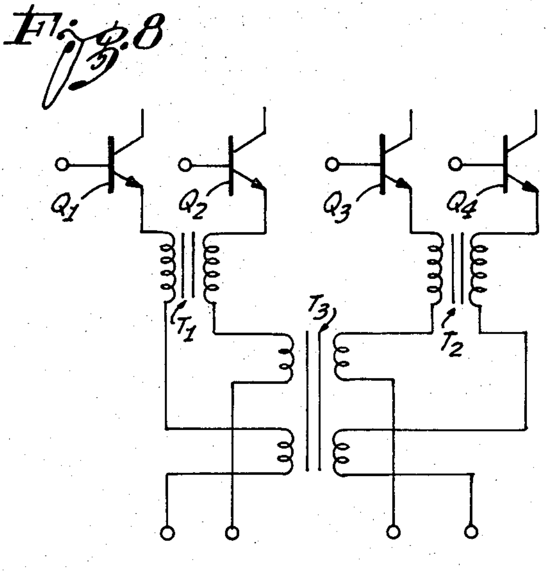
FIG. 8 is a circuit like. 4, but without the common base or collector connections.

The circuits of FIGS. 7 and 8 are similar to the circuits of FIGS. 3 and 4 respectively, and they function in the same manner. In the circuits of FIGS. 7 and 8, however, there is no common connection of the base and collector electrodes of the individual circuits.

While particular embodiments of the invention have been shown and described, modifications may be made. It is intended to cover all modifications which come within the spirit and scope of the invention in the following claims.

What is claimed is:

1. A transistor system providing a parallel combination of a plurality of transistors, and also providing equal current division between the transistors during normal conductive periods and during turn-off operations of the transistors, said circuit comprising: three transistors each having base, emitter and collector electrodes; a first transformer intercoupling the emitter electrodes of two of said three transistors, said first transformer having a first winding connected to the emitter electrode of one of the two transistors and having a second winding connected to the emitter electrode of the other of the three transistors; common circuitry connecting the other side of said first and second windings of said first transformer to a common potential point; and a second transformer interposed in said common circuitry and having first and second windings with a turns ratio of 2:1, said first winding of said second transformer being connected to the emitter of the remaining one of said three transistors.

2. The system defined in claim 1, and which includes circuitry interconnecting the base electrodes of said three transistors.

3. The system defined in claim 1, and which includes circuitry interconnecting the collector electrodes of said three transistors.

4. The system defined in claim 1, in which said first and second transformers each comprises an annular ferrite core, and in which said windings of each of said transformers are wound on said core.

* * * * *